July 30, 1957  A. MANZI  2,800,739
FISH LURE
Filed Nov. 16, 1953
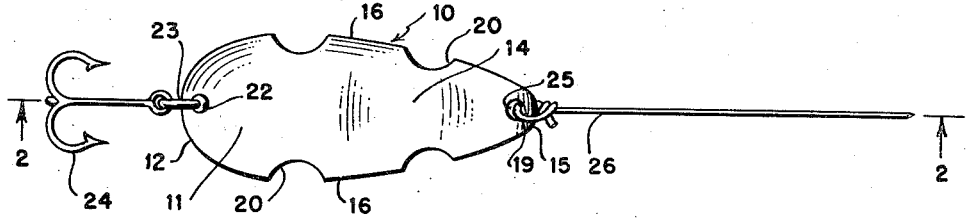
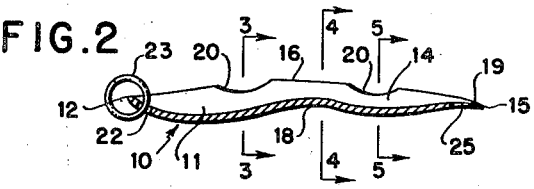
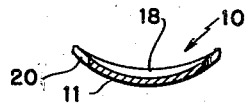 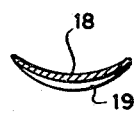 
FIG.3   FIG.4   FIG.5
*INVENTOR.*
Anthony Manzi
BY
ATTORNEY

United States Patent Office 2,800,739
Patented July 30, 1957

2,800,739
FISH LURE
Anthony Manzi, Croton-on-Hudson, N. Y.

Application November 16, 1953, Serial No. 392,085

4 Claims. (Cl. 43—42.5)

The present invention relates to a fishing lure, particularly to a fishing lure of the spoon type, that is of shiny, light reflecting characteristics, and has for its principal and primary object to provide a lure of the character described that will exercise greater attraction upon the fish and will thereby enable a fisherman to obtain greater catches more quickly.

Generally stated, the present invention contemplates the attainment of its objects by the provision of a lure that more closely simulates the movement of a living body through the water than has been possible with the lures of the same general character heretofore in use.

More specifically stated, the present invention contemplates the provision of a lure which performs movements in a multiplicity of directions as it is moved through the water at the end of a line; namely, one that will move in a vertical direction along a wave-like path and also laterally, in a wave-like path, and additionally will have a rocking motion, moving or rolling from side to side, without spinning, so that light is reflected from its shiny, glistening surface in many directions.

It is also an object of the present invention to provide a lure of the character described which may be used in the same manner as the lures of the same general character have heretofore been used and with the same fishing equipment.

It is a further object of the present invention to provide a fishing lure of the character described which attains its additional motility by simple means, without any complicating additional structures, so that it remains of simple construction, of relatively light weight and is economical to produce.

The foregoing and other advantages and superiorities of the fishing lure of the present invention will become more readily apparent to those skilled in the art from the embodiment thereof shown in the accompanying drawing and from the description following. It is to be understood, however, that such embodiment is shown by way of illustration only, to make the principles and practice of the invention more readily comprehensible, and without any intent of limiting the invention to the specific details therein shown.

In the drawings:

Fig. 1 is a top plan view of one embodiment of a fishing lure of the present invention, shown with hook attached and secured to a fishing line.

Fig. 2 is a longitudinal sectional view of the same, taken on line 2—2 of Fig. 1.

Fig. 3 is a section taken on line 3—3 of Fig. 2;

Fig. 4 is a transverse section taken on line 4—4 of Fig. 2; and

Fig. 5 is a similar sectional view taken on line 5—5 of Fig. 2.

Referring more specifically to the accompanying drawing, the lure of the present invention, generally designated as 10, is formed preferably of a metallic or other suitable sheet material that inherently possesses a shiny, glistening surface or which may be provided with a shiny, glistening surface, as by polishing or by plating, as with nickel and/or chromium, or the like.

The lure 10 is of general tapering oval shape or outline; wider at one end, namely, the rear end 11 which is formed with a preferably widely curved rear edge 12 and narrower at its other forward end 14, likewise formed with a curved edge 15 and having the convergent edges 16 along its sides.

The lure 10 is of general transversely arcuate or curved shape and is formed with a centrally disposed, flattened, less arcuate area 18 which divides the lure into the distinct rear and forward sections 11 and 14.

Each of the sections 11 and 14 are also arcuate or curved, to a lesser degree, in a longitudinal direction, in the same direction, except for the lead end or tip 19 which is slightly curved or bent in an opposed direction, as will be clearly seen from Figs. 2, 4 and 5.

Cutouts 20 are formed in each portion of the side edge 16 of each of sections 11 and 14, which cutouts are preferably of curved or semicircular shape, as illustrated.

The lure 10 may be provided with the conventional aperture 22, at the rear, wherethrough a link or ring 23 may be engaged to which a conventional fish hook 24 may be linked. Similarly, an opening 25 may be formed in the downturned lead end portion 19, whereby the lure may be attached to a fishing line 26.

This completes the description of the fish lure of the present invention. It will be apparent that such a lure may be easily and economically produced by a single operation, as by stamping from a flat sheet of metal with a single die which both, cuts out the lure, including its cutouts 20 and openings 22 and 25, and at the same time forms it into its arcuate shape by providing it with the requisite curvature.

It will be seen that, as the fish lure 10 is moved through the water by the pull of the fishing line 26, it will be caused first to rise, due to the curvature of the tip 19, to a certain point at which the forward pull of the fishing line will overcome the steering force of the tip 19, and the lure will be caused to dip. Such motion will continuously alternate during any forward movement of the lure to cause it to move in a wave like track in a vertical direction. Simultaneously, the combination of cut-outs 20 and the division of the lure into forward and rear sections 14 and 11, respectively will cause the lure to move laterally, alternately from one side to another and also to rock or oscillate about its longitudinal axis, without however, being caused to spin completely around.

It will also be apparent that numerous variations and modifications may be made in the fish lure of the present invention, by any one skilled in the art, in accordance with the principles of the invention hereinabove set forth and without the use of any inventive ingenuity. I desire, therefore, to be protected for any and all such variations and modifications that may be made within the spirit of the present invention and the scope of the claims hereto appended.

What I claim is:

1. A fish lure of the character described, comprising a relatively thin, flat, elongated rigid body of tapering oval shape, said body having a transverse arcuate cross-section and having a central portion of shallower transverse curvature than the maximum transverse curvature of its end portions and dividing said body into forward and rear sections, each of said forward and rear sections being also longitudinally curved, said body having its narrower end edge portion bent in a direction opposite to the direction of the longitudinal curvature of said forward and rear sections, and having opposed portions cut out from the longitudinal edge portions thereof at approximately the mid point of each of said forward and rear sections.

2. The fish lure of claim 1, wherein said cut out portions are of approximately semi-circular shape.

3. A fish lure of the character described, comprising a relatively thin, flat, elongated rigid body of tapering oval shape, said body being of arcuate transverse section and having a central portion of shallower curvature than the maximum transverse curvature of its end portions, and dividing said body into forward and rear sections, each of said forward and rear sections being also longitudinally curved, said body having its narrow end at the end of said forward section, said narrow end being bent in a direction opposite to the direction of the longitudinal curvature of the forward and rear sections, each of said forward and rear sections having oppositely disposed cutouts formed in its longitudinal edge portions at approximately the mid point of each of said forward and rear sections.

4. The fish lure of claim 3, wherein each of said cutouts is of approximately semi-circular shape.

References Cited in the file of this patent

UNITED STATES PATENTS

| | | |
|---|---|---|
| 1,085,416 | Raymond | May 12, 1931 |
| 1,969,944 | Reinard | Aug. 14, 1934 |
| 1,978,843 | Jensen | Oct. 30, 1934 |
| 2,043,001 | Lambrecht | June 2, 1936 |
| 2,311,985 | Heddon | Feb. 23, 1943 |
| 2,522,725 | Schiffmann | Sept. 19, 1950 |
| 2,665,516 | Race | Jan. 12, 1954 |

FOREIGN PATENTS

| | | |
|---|---|---|
| 108,245 | Sweden | 1943 |
| 195,578 | Switzerland | 1938 |